(12) United States Patent
Hurley et al.

(10) Patent No.: US 6,847,767 B2
(45) Date of Patent: Jan. 25, 2005

(54) SELF-SUPPORTING CABLES AND AN APPARATUS AND METHODS FOR MAKING THE SAME

(75) Inventors: William C. Hurley, Hickory, NC (US); John D. Coleman, Hickory, NC (US); Warren W. McAlpine, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 32 days.

(21) Appl. No.: 10/395,965

(22) Filed: Mar. 25, 2003

(65) Prior Publication Data

US 2003/0202756 A1 Oct. 30, 2003

Related U.S. Application Data

(60) Division of application No. 09/344,151, filed on Jun. 24, 1999, now Pat. No. 6,563,990, which is a continuation-in-part of application No. 09/280,503, filed on Mar. 30, 1999, now Pat. No. 6,188,822, which is a continuation-in-part of application No. 09/102,392, filed on Jun. 22, 1998, now Pat. No. 6,188,821.

(51) Int. Cl.[7] .............................................. G02B 6/44
(52) U.S. Cl. ...................................... 385/101; 385/113
(58) Field of Search .......................... 385/100, 101–103, 385/109–114, 106, 107; 29/888.452; 174/41, 40 R, 115; 156/51

(56) References Cited

U.S. PATENT DOCUMENTS

| | | | |
|---|---|---|---|
| 3,887,265 A | 6/1975 | Margolis et al. | 350/96 |
| 4,148,560 A | 4/1979 | Margolis | 350/96.23 |
| 4,188,088 A | 2/1980 | Andersen et al. | 350/96.23 |
| 4,195,906 A | 4/1980 | Dean et al. | 350/96.23 |
| 4,355,865 A | 10/1982 | Conrad et al. | 350/96.23 |
| 4,359,598 A | 11/1982 | Dey et al. | 174/40 |
| 4,390,238 A | 6/1983 | Van Der Hoek | 350/96.23 |
| 4,401,361 A | 8/1983 | Slaughter | 350/96.23 |
| 4,420,220 A | 12/1983 | Dean et al. | 350/96.23 |

(List continued on next page.)

FOREIGN PATENT DOCUMENTS

| | | | | |
|---|---|---|---|---|
| DE | 4142729 A1 | 7/1993 | | H01B/11/22 |
| EP | 0141002 A1 | 10/1983 | | B29C/47/02 |
| EP | 0141002 * | 5/1985 | | B29C/47/03 |
| EP | 0569679 A1 | 11/1993 | | G02B/6/44 |
| EP | 0629889 A1 | 12/1994 | | G02B/6/44 |
| JP | 11-84184 | 3/1999 | | G02B/6/44 |

*Primary Examiner*—Brian Healy
*Assistant Examiner*—Michael P. Mooney
(74) *Attorney, Agent, or Firm*—Timothy J. Aberle

(57) ABSTRACT

Cables and an apparatus and methods for making cables having at least one messenger section, transmission sections, and at least two series of connecting webs. At least one series of webs can be intermittently formed. The messenger section can include a messenger wire for supporting the cable, and the transmission sections can include electrical/electronic and/or optical transmission components. A method of making cables may include the steps of pulling cable components through a melt cavity having a molten jacketing material therein; defining at least three cable sections by coating the cable components with the molten jacketing material; monolithically forming at least two series of connecting webs made of the molten jacketing material between each cable section during a web-forming mode; and defining intermittent webs by forming longitudinal gaps between the webs of at least one of the series of webs during a gap-forming mode by switching between the web-forming and gap-forming modes with respect to the at least one series of webs. The apparatus includes a melt cavity associated with a die orifice having web-forming sections, and gap forming parts associated with the web-forming sections, the gap forming parts being operative to block the flow of the cable jacketing material for forming gaps defining the webs.

12 Claims, 3 Drawing Sheets

U.S. PATENT DOCUMENTS

| | | | |
|---|---|---|---|
| 4,467,138 A | 8/1984 | Brorein | 174/115 |
| 4,533,790 A | 8/1985 | Johnston et al. | 174/115 |
| 4,729,628 A | 3/1988 | Kraft et al. | 350/96.23 |
| 4,775,212 A | 10/1988 | Smith | 350/96.23 |
| 4,776,664 A | 10/1988 | Okura | 350/96.23 |
| 4,815,814 A | 3/1989 | Ulijasz | 350/96.23 |
| 4,952,020 A | 8/1990 | Huber | 350/96.23 |
| 5,039,195 A | 8/1991 | Jenkins et al. | 385/101 |
| 5,155,304 A | 10/1992 | Gossett et al. | 174/117 |
| 5,180,890 A | 1/1993 | Pendergrass et al. | 174/117 |
| 5,469,523 A | 11/1995 | Blew et al. | 385/101 |
| 5,602,953 A | 2/1997 | Delage et al. | 385/101 |
| 5,651,081 A | 7/1997 | Blew et al. | 385/101 |
| 5,777,535 A | 7/1998 | Farfoud et al. | 333/243 |
| 6,134,360 A | 10/2000 | Cheng et al. | 385/39 |
| 6,188,821 B1 | 2/2001 | McAlpine et al. | 385/100 |
| 6,188,822 B1 | 2/2001 | McAlpine et al. | 385/100 |

\* cited by examiner

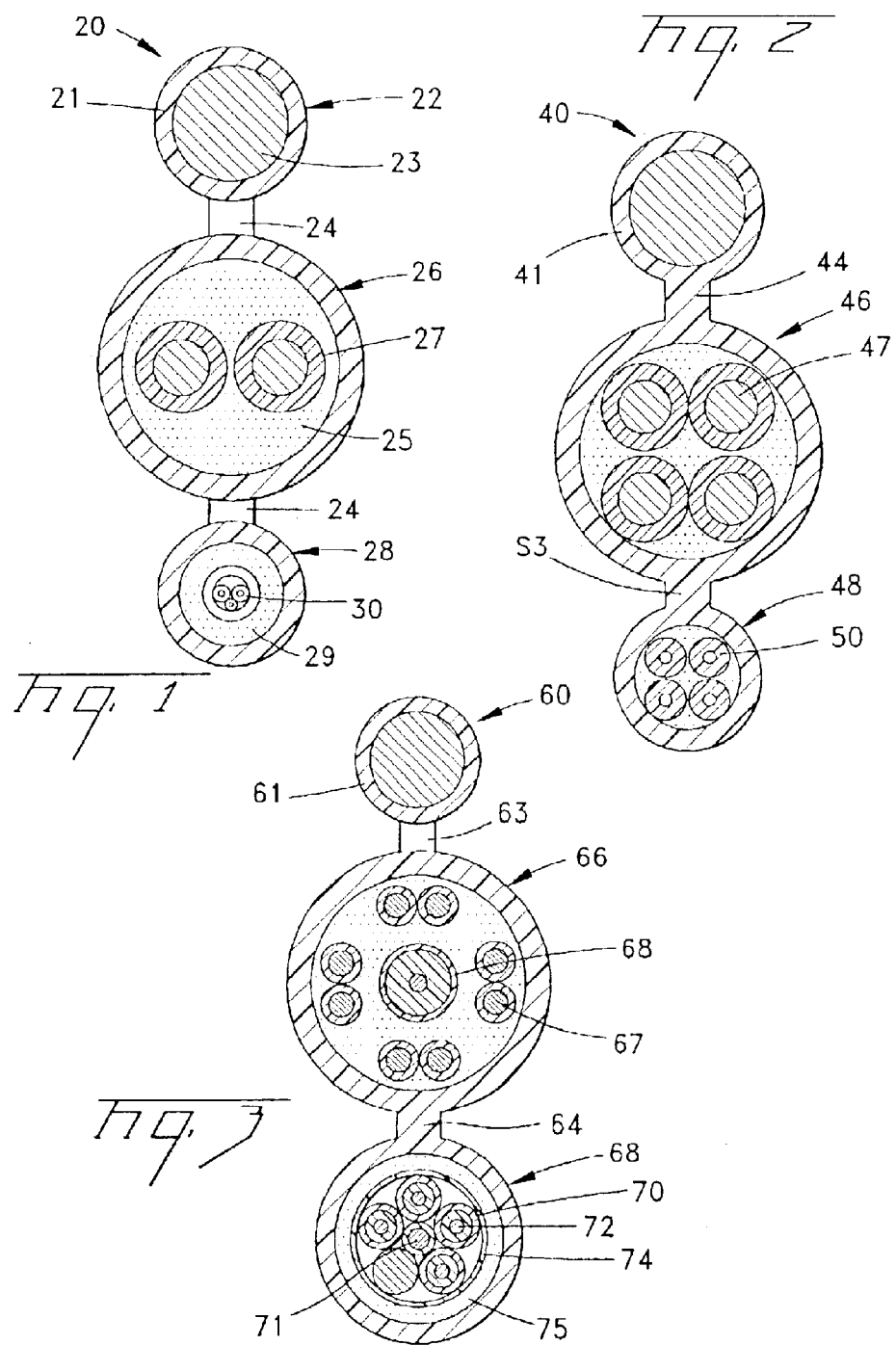

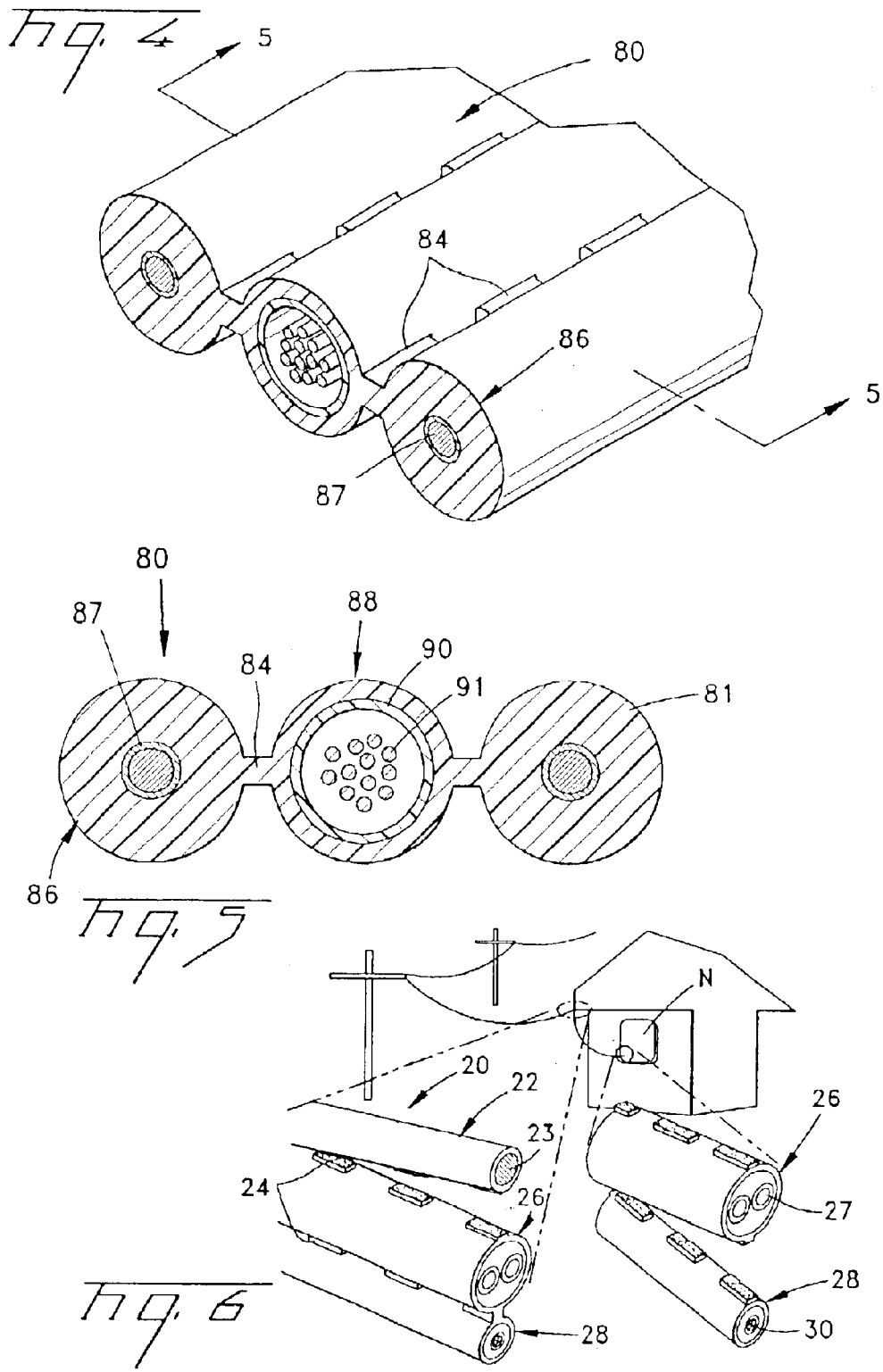

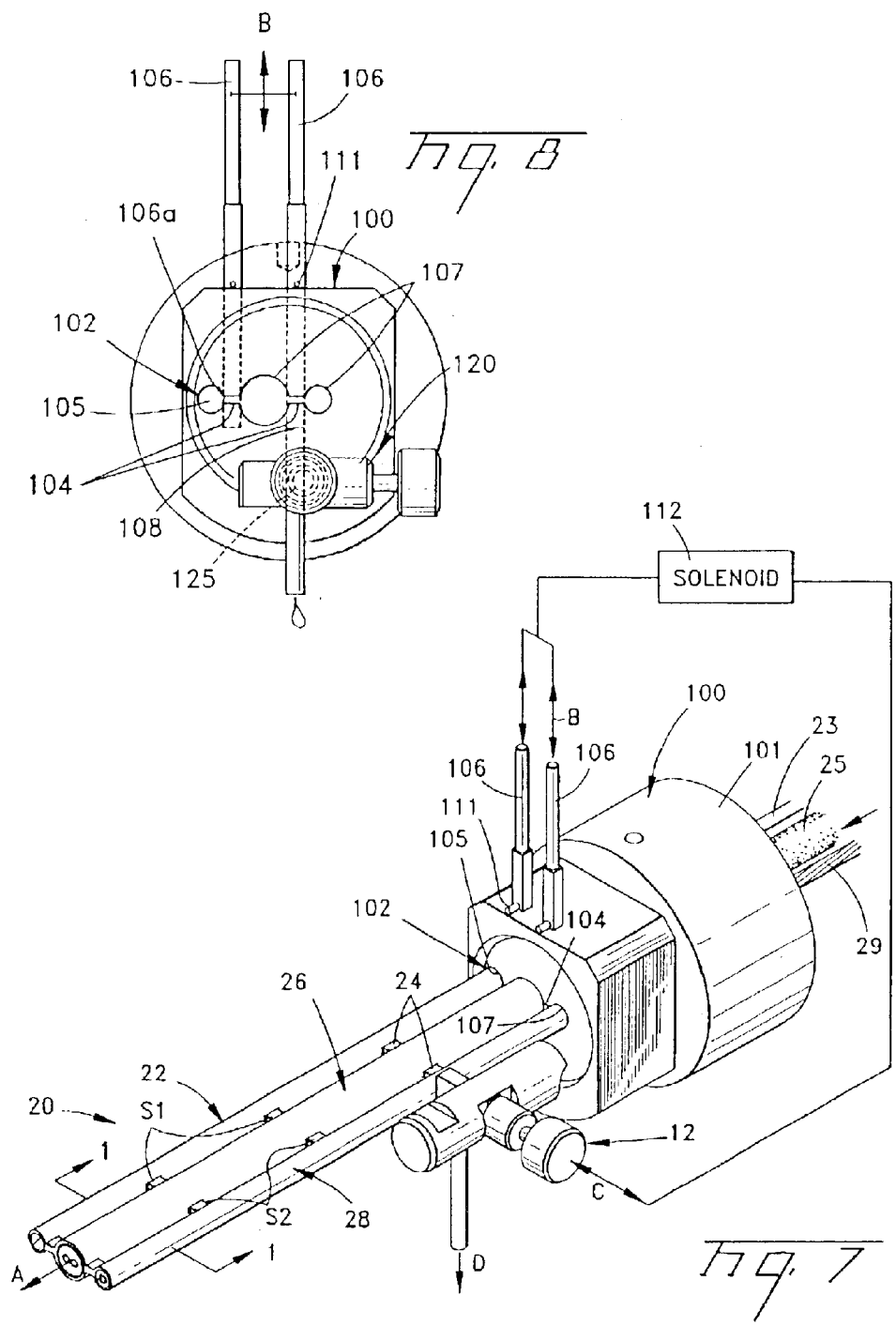

SELF-SUPPORTING CABLES AND AN APPARATUS AND METHODS FOR MAKING THE SAME

RELATED APPLICATIONS

The present application is a Divisional of U.S. Ser. No. 09/344,151 filed on Jun. 24, 1999 now U.S. Pat. No. 6,563,990, which is a Continuation-In-Part of Ser. No. 09/280,503 filed Mar. 30, 1999, now U.S. Pat. No. 6,188,822, which is a Continuation-In-Part of Ser. No. 09/102,392, filed Jun. 22, 1998, now U.S. Pat. No. 6,188,821.

FIELD OF INVENTION

The present invention relates to cables, and an apparatus and methods for making cables, that can include at least one optical fiber.

BACKGROUND OF THE INVENTION

Fiber optic cables include at least one optical fiber that can transmit telecommunication information, for example, voice, data, and video information. Self-supporting fiber optic cables are designed for aerial applications and typically include a messenger wire and a core section having conductors therein that may be solely optical or a combination of optical and electrical conductors. Self-supporting fiber optic cables of the FIG. 8 type may be characterized into two general categories, namely, self-supporting cables with a core section having no excess length relative to the messenger wire, and self-supporting cables having a core section having an over-length, typically about 0.2%, relative to the messenger wire. Examples of self-supporting cables having no core section over-length are disclosed in U.S. Pat. Nos. 4,449,012, 4,763,983, 5,095,176, and 5,371,823. Examples of self-supporting cables having a core section over-length are disclosed in U.S. Pat. Nos. 4,662,712 and 4,883,671.

When installed in a self-supporting application, self-supporting cables may experience a high degree of tension. The messenger wire bears most of the tension, thereby supporting the core section, and protecting the optical fibers in the core section from high tensile forces. As tension acts on the messenger wire, however, the messenger wire tends to elongate, which results in an elongation of the core section. Elongation of the core section of a self-supporting fiber optic cable not having an over-length may cause attenuation losses and/or can compromise mechanical reliability of the optical fibers. On the other hand, where the core section of a self-supporting cable having a core section over-length is elongated, the elongation is, up to the amount of existing over-length of the core section, advantageously taken up by the over-length in the core section whereby the core section may be elongated without potentially causing strain and/or attenuation in the optical fibers.

The extruder cross-head used to manufacture self-supporting cables can be configured to define continuous or intermittent webs for connecting cable sections, for example, as disclosed in U.S. Pat No. 4,467,138. Web-forming extruder cross-heads include a single plunger, e.g., as is disclosed in JP-46-38748 and JP-8-75969. As disclosed in JP-8-75969, for example, the extruder head includes a melt cavity with a molten jacketing material therein. As the messenger wires and core translate through the melt cavity they are coated with the molten jacketing material. As the messenger wires and core exit the extruder head, a die orifice determines the peripheral shape of the cable jacket therearound, and the orifice includes a web-forming area for the formation of webs. The plunger operates by moving into a blocking position in the die orifice between cable sections, physically blocking the molten jacketing material from forming the web. The plunger is reciprocated in and out of the blocking position so that the webs are formed intermittently, spaced by longitudinal gaps.

BRIEF DESCRIPTION OF THE DRAWING FIGURES

FIG. 1 is a cross sectional view of a fiber optic cable according to the present invention taken at line 1—1 of FIG. 7.

FIG. 2 is a cross sectional view of a fiber optic cable according to the present invention.

FIG. 3 is a cross sectional view of a fiber optic cable according to the present invention.

FIG. 4 is an isometric view of a fiber optic cable according to the present invention.

FIG. 5 is a cross sectional view of the fiber optic cable of FIG. 4.

FIG. 6 is a schematic view of an exemplary application for fibers optic cables according to the present invention.

FIG. 7 is an isometric view of an extruder head according to the present invention for use in manufacturing fiber optic cables according to the present invention.

FIG. 8 is a front view of the extruder cross-head of FIG. 7.

DETAILED DESCRIPTION OF THE INVENTION

Referring to FIGS. 1–5, exemplary embodiments of fiber optic cables 20,40,60,80 according to the present invention will be described. Fiber optic cable 20 (FIGS. 1 and 7) can be a self-supporting cable that is composed of cable sections, for example, a messenger section 22 and transmission sections 26 and 28. Each cable section preferably comprises a portion of a cable jacket 21 having webs 24 that connect cable sections 22,26,28 together. Messenger section 22 preferably comprises non-metallic and/or metallic strength members, for example, aramid or fiberglass yarns, glass reinforced plastic rods, and/or a steel messenger wire 23. Transmission section 26 preferably comprises at least one transmission component, for example, an electrical/electronic component 27. Transmission component 27 can be, for example, a twisted pair of electrical wires that are preferably surrounded by a layer of strength members 25. Transmission component 27 preferably performs, for example, a data or power transmission function. Transmission section 28 preferably includes at least one optical fiber, for example, in an optical unit 30. Optical unit 30 preferably comprises at least one single mode, multi-mode, or multi-core optical fiber, and may be surrounded by a layer of strength members 29. Strength members 25,29 preferably comprise filaments, for example, aramid strength members with or without a coating of water blocking grease, or a superabsorbent powder or matrix coating. Alternatively, in lieu of strength members 25,29 the transmission components can be generally surrounded by a water blocking grease. Jacket 21 preferably is formed of, for example, PVC, FRPE, PE, or a UV curable resin, e.g., an acrylate. Webs 24 are preferably intermittently formed along the length of the cable and are sized to be ripped manually, or with tools, for separating sections 22,26,28.

Fiber optic cables according to the present invention can include any suitable kind or number of optical transmission components for the transmission of telecommunications information, and/or electrical/electronic transmission components for transmitting telecommunications information and/or power. For example, fiber optic cable 40 (FIG. 2) includes a transmission section 46 having more than one pair of twisted wires 47. Fiber optic cable 60 (FIG. 3) preferably includes a transmission section 66 comprising a composite of power-transmitting conductors 67 disposed about at least one coaxial electrical conductor 68, and fiber optic cable 80 (FIGS. 4–5) preferably includes a transmission section 86 including copper clad steel strength members 87.

Fiber optic cables according to the present invention can include any suitable kind or number of optical transmission components. For example, fiber optic cable 40 can include a transmission section 48 having tight buffered optical fibers 50. Fiber optic cable 60 can include a loose tube core comprising a central member 71, an optical component 70 having loose buffered optical fibers 72, a core wrap or water swellable tape 74, and strength members 75. As a further illustration, fiber optic cable 80 can include a transmission section 88 having an optical component 90 including, for example, a mono-tube with loose and/or bundled optical fibers 91 therein. Cable sections 26,46,66,86 can include at least one optical transmission component, and cable sections 28,48,68,88 can include one or more electrical/electronic transmission components.

In other aspects of the present invention, each cable jacket 21,41,61,81 can include, for example, intermittent webs 24 or 81 (FIGS. 1, 4–6, and 7), continuous webs 44 (FIG. 2), or a combination of a intermittent and continuous webs 63,64 (FIG. 3). Webs 24,44,63,64,84 can be sized for ease of manual or tool-assisted separation of the respective cable sections. The web thickness can be less than about 75% of the diameter/thickness of the largest cable section, preferably less than about 50%, and most preferably less than about 25% thereof.

As an illustration, fiber optic cables of the present invention can be used in a fiber-to-the-home (FTTH) application (FIG. 6). In the exemplary application, a craftsman would separate messenger section 22 from transmission section 26 by tearing or snipping webs 24. Next, strength member 23 of messenger section 22 is mechanically attached to, for example, a house. Transmission sections 26,28 are then dropped to a network interface device N containing, for example, a modem that can be powered by electrical components 27 and optically interconnected with optical transmission component 30.

Additional aspects of the present invention include methods and an apparatus for making fiber optic cables according to the present invention. With reference to FIGS. 7–8, an exemplary apparatus and manufacturing process will be described with exemplary reference to fiber optic cable 20. According to the present invention, extruder cross-head 100 can be used to extrude jacket 21 and webs 24. More specifically, extruder cross-head 100 extrudes molten jacketing material that forms jacket 21 and webs 24 as cable 20 moves along the direction of arrow A (FIG. 7). Extruder cross-head 100 preferably includes a body 101 with a melt cavity therein. The melt cavity receives molten jacketing material from an extruder (not shown), messenger wire 23, strength members 25 with transmission components 27, and strength members 29 with optical unit 30 therein. Extruder cross-head 100 preferably includes a die orifice 102 having web forming sections 104 (FIG. 8), a messenger profile area 105, and transmission profile areas 107. Transmission profile areas 107 apply the jacketing material to strength members 25,29 by, for example, a tube-on application combined with a draw down vacuum. Messenger profile area 105 applies the jacketing material to messenger wire 23 by, for example, pressure extrusion.

Extruder head 100 preferably includes at least one gap forming part that performs a gap forming function, for example, a plunger 106 that is movably mounted to body 101 for reciprocating action along the direction of arrow B (FIG. 7). Extruder cross-head 100 can include at least two plungers 106 operative to reciprocate between blocking and non-blocking positions with respect to web forming sections 104. At least one plunger 106 can include a radius 106*a* (FIG. 8), adjacent to messenger profile area 105, complementing the outer surface of the messenger portion of jacket 21. The advance of plungers 106 can be stopped by respective dowel pins 111 fastened thereto. The tip ends of plungers 106 can be received in respective recesses 108 of body 101 (FIG. 8). Moreover, the plungers can be located on opposed sides of die orifice 102, for example, one on top and the other on the bottom (not shown). The motion of plungers 106 can be operatively interlocked to move in unison, can be operated independently of each other, and/or can be timed to be at the same or different web forming positions to suit the desired web forming need. Extruder cross-heads according to the present invention may include more than one pressure regulating device.

The present invention preferably includes a pressure regulating device 120 (FIGS. 5 and 6) attached to extruder cross-head 100 for regulating the pressure in the melt cavity, as described in U.S. Ser. No. 09/280,503 incorporated by reference herein. Pressure regulating device 120 is operative to keep the melt cavity pressure substantially constant, i.e., there will be substantially no pressure fluctuation in the melt cavity as plungers 106 are reciprocated between the blocking, i.e., gap-forming, and non-blocking, i.e., web forming, positions.

As plungers 106 are switched between web-forming and gap-forming modes, pressure-regulating device 120 is preferably controlled in sync therewith to assure uniform jacket thickness. For example, plungers 106 and pressure regulating device 120 are preferably operatively connected to motion actuating devices, for example, dual acting pneumatic cylinders (not shown). The pneumatic cylinders can be operatively associated with a pneumatic solenoid 112, shown schematically in FIG. 7, that can simultaneously control the positions of the motion actuating devices along the directions of arrows B and C. Solenoid 112 can be controlled by, for example, a conventional programmable logic controller (PLC) (not shown) that interfaces with a cable length counter (not shown) and is programmed to switch the solenoid based on cable length information received from the length counter. The PLC can also be programmed to change the length of webs 24 and/or the longitudinal gaps between webs by driving plungers 106 accordingly. In addition, the PLC can be programmed to have both plungers in a non-intermittent web-forming mode for forming a cable with continuous webs (FIG. 2), one of the plungers can be operated to make intermittent webs with the other plunger forming a continuous web (FIG. 3), or both plungers 106 can be driven to form intermittent webs (FIGS. 1, 4–6, and 7). When solenoid 112 is switched between web-forming and longitudinal gap-forming modes by the PLC, the motion actuating devices can act in parallel to cause plungers 106 and pressure regulating device 120 to be switched at the same time. Plungers 106 can be controlled to suit the desired cable design and materials cost requirements. For example, where both plungers 106 are operated to form intermittent webs, the webs can be spaced at generally the same axial locations along the cable, the respective locations of the webs can have a staggered spacing, and/or the sizes/thickness of the webs can be the same or different.

An exemplary operation of extruder cross-head 100 for applying jacket 21 will now be described. Continuing the example of cable 20, the method according to the present invention preferably comprises the steps of: pulling messenger wire 23, strength members 25 with transmission components 27, and strength members 29 with optical component 30 therein through a melt cavity having a molten jacketing material therein; defining messenger section 22 and transmission sections 26,28 by coating the messenger wire 23, strength members 25, and strength members 29 with the molten jacketing material; and forming webs between at least respective cable sections 22,26,28. Moreover, any of the cable sections can be formed with an over-length, for example, by conventional parameter control methods including the application of tension or velocity differential methods. Application of tension to cable components can stretch the components relative to the messenger wire so that after release of the tension the stretched components relax and have an over-length relative to the messenger wire. In the velocity differential method, the cable components are fed at a faster speed relative to the messenger wire thereby creating an over-length with respect thereto. Transmission sections could have different amounts of over-length relative to each other and with respect to the messenger wire.

More specifically, messenger wire 23, strength members 25 with transmission components 27, and strength members 29 with optical component 30 therein are moved at suitable velocity and tension parameters into the melt cavity of body 101. Transition section profile area 107 applies the jacketing material by a tube-on process including application of a vacuum to draw jacket 21 tightly against strength members 25,29. Messenger profile area 105 applies the jacketing material to messenger wire 23 by a pressure extrusion process whereby the interstices between the wire strands are preferably completely filled with jacketing material. Cable sections 22,26,28 of fiber optic cable 20 emerge from the outlet side of extruder cross-head 100 for further processing down the line. Webs 24 are monolithically and intermittently formed as part of jacket 21 during the process. Velocity differential and/or release of tension on the cable sections can result in an over-length relative to messenger wire 23.

During the web-forming mode of the jacketing process, the molten jacketing material is expressed into web-forming sections 104 thereby forming webs 24. At this point, solenoid 112 requires the motion actuating devices to position plungers 106 such that the plungers are retracted from web forming sections 104, and pressure regulating device 120 is inactive. At this time in the process, the jacketing material inside the melt cavity experiences an initial melt cavity pressure. In the exemplary process, webs 24 are made intermittently along the length of fiber optic cable 20. To accomplish this, solenoid 112 is repeatedly switched from the web-forming mode to the gap-forming mode and back again according to a program in the PLC. Webs 24 are formed in more than one web series between respective cable sections, for example, series S1, S2 (FIG. 7), and a web series may include a single continuous web S3 (FIG. 2). Specifically, the gap-forming mode requires plungers 106 to be in the blocking position, and pressure regulating device 120 to be in a position to relieve pressure in the melt cavity by releasing molten jacketing material for the interval of time that the gaps are being formed. The purpose of pressure regulating device 120 is to maintain the pressure in the melt cavity at substantially the initial melt cavity pressure during the gap-forming mode. To accomplish this purpose, jacketing material will be released by pressure regulating device 120 during formation of the longitudinal gaps. In other words, when plungers 106 are in the blocking position and the longitudinal gaps are being formed, an amount of molten jacketing material can be released by pressure regulating device 120 sufficient to avoid a substantial increase in melt cavity pressure. The amount of expressed material can be roughly equal to the volume of material that would fill the longitudinal gaps if the plunger was not used.

The amount of jacketing compound that is released to avoid the increase in pressure can depend upon process and extruder cross-head variables, to name a few, the physical characteristics of the jacketing material (e.g. viscosity and density), melt cavity temperature and pressure, and product line speed. The PLC program controls the intervals of time during which the web-forming and gap-forming modes are operative. The controlled release of jacketing material from the melt cavity by pressure regulating device 120 avoids substantial pressure fluctuations. Where the webs are formed continuously pressure regulating device 120 need not be activated.

The methods of the present invention can be applied to make fiber optic cables with webs formed continuously, intermittently, or both, and with substantially uniform cross sectional jacket thicknesses.

The present invention has been described with reference to the foregoing exemplary embodiments, which embodiments are intended to be illustrative of the present inventive concepts rather than limiting. Persons of ordinary skill in the art will appreciate that variations and modifications of the foregoing embodiments may be made without departing from the scope of the appended claims. The concepts described herein can be applied to, for example, opto/electronic composite, buried, indoor, and indoor/outdoor cable applications. The concepts described herein can be applied to cables including metallic conductors without optical components, for example, a cable with a twisted pair in one transmission section and a coaxial cable in another transmission section. Any cable section can include an armor layer, more than one messenger section can be used, and a messenger section can be located adjacent or between any transmission section. The cable sections preferably have centers thereof generally aligned in a plane, or the cable sections can be offset, for example, the cable sections can be connected in V-shaped, L-shaped or triangular configurations, e.g., each section can be connected to two other cable sections, so that at least some of the cable section centers are in a common plane. Flame retardant jacket materials can be selected to achieve, plenum, riser, or LSZH flame ratings. Water absorbing or blocking substances may be included in any interstice in accordance with application requirements. The geometry of the webs shown in the drawing figures is exemplary, other web geometries may be used, for example, notches, grooves, arcuate surfaces, or any other suitable shape for attaining a balance between strength in connecting the cable sections are ease of separability during installation. The methods of the present invention can include the steps of forming the messenger section jacket by a tube-on process with a draw down vacuum, and applying the transmission section jackets by pressure extrusion. Alternatively, the step of forming the messenger and transmission section jackets can include the same method of applying the jacketing material. The gap forming parts can be other than plungers, for example, they can be gates, blades, pins, disks, vanes, partitions, or plugs and can be associated with power or motion transmitting components in lieu of or in addition to the cylinders, for example, bearings, rocker arms, cams, gears, electrical components, and/or linkages. The cable sections can be marked according to any suitable marking scheme, for example, indent marking with or without tape, sequential marking, and/or co-extrusion striping.

What is claimed is:

1. A method of making a cable having a cable jacket with webs, comprising the steps of:
   (a) pulling cable components through a melt cavity having a molten jacketing material therein;
   (b) defining at least three cable sections by coating the cable components with said molten jacketing material;
   (c) monolithically forming at least two series of connecting webs made of said molten jacketing material between each said cable section during a web-forming mode; and
   (d) defining intermittent webs by forming longitudinal gaps in at least one of said series of webs during gap-forming mode by switching between said web-forming and gap-forming modes.

2. The method of claim 1, comprising the step of regulating the pressure of said molten jacketing material to minimize pressure fluctuations during the gap-forming mode.

3. The method of claim 1, the step of forming respective gaps in said at least one series of webs being performed by a gap-forming part that blocks the flow of said molten jacketing material.

4. The method of claim 1, the step of forming said connecting webs being performed by retracting a gap-forming part from said melt cavity.

5. The method of claim 1, the step of forming at least one of said cable sections including pressure extrusion of said molten jacketing material.

6. The method of claim 1, the step of forming at least one of said cable sections including tubing-on and drawing down said molten jacketing material with a vacuum.

7. The method of claim 1, the step of defining intermittent webs by forming longitudinal gaps comprising forming intermittent webs in at least two of said series of webs.

8. A method of making a cable having a cable jacket with webs, comprising the steps of:
   (a) pulling cable components through a melt cavity having a molten jacketing material therein;
   (b) defining at least three cable sections by coating the cable components with said molten jacketing material and defining at least one messenger cable section for supporting said cable, at least one transmission cable section comprising at least one optical transmission component, and at least one transmission cable section comprising at least one electrical/electronic transmission component, at least one respective strength filament being disposed within each respective transmission cable section adjacent each said at least one transmission component; and
   (c) monolithically forming at least two series of connecting webs made of said molten jacketing material between each said cable section during a web-forming mode.

9. An apparatus for extruding a cable jacketing material, comprising:
   a melt cavity associated with a die orifice comprising web-forming sections for forming distinct webs between cable sections;
   at least one gap forming part associate with at least one of said web-forming sections, said gap forming part being operative to block the flow of said cable jacketing material for forming webs between at least two of said cable sections and said gap forming part being operatively associate with a pressure regulating device in communication with said melt cavity for regulating the pressure of said melt cavity.

10. The apparatus of claim 9, said gap forming parts comprising a plunger.

11. The apparatus of claim 9, a second gap forming part associated with another of said web-forming sections.

12. The apparatus of claim 9, said gap forming part being mounted to said apparatus for reciprocating action with respect to said at least one web-forming section.

* * * * *